UNITED STATES PATENT OFFICE.

LUDWIG ADRIAN SANDERS, OF AMSTERDAM, AND ARTHUR JULIUS SANDERS, OF SLOTEN, NETHERLANDS.

COATING PROCESS.

1,364,587.     Specification of Letters Patent.     Patented Jan. 4, 1921.

No Drawing.     Application filed December 10, 1915. Serial No. 66,119.

*To all whom it may concern:*

Be it known that we, Doctor LUDWIG ADRIAN SANDERS and ARTHUR JULIUS SANDERS, subjects of the Queen of the Netherlands, residing at Amsterdam and Sloten, respectively, Netherlands, have invented certain new and useful Improvements in Coating Processes, of which the following is a specification.

The present invention comprehends an improved process of coating bodies or objects consisting of cement, cement mortar, lime trass mortar, or concrete, whereby the surfaces of such bodies are colored with a variety of different tints, and at the same time, hardened to a very considerable extent.

The process consists primarily in the application, to the surfaces of the objects to be treated, of a metallic coating, which consists of a solution of a metal salt or salts other than fluorin and its derivatives, with the result that the action of the salt or salts not only produces a brilliant coloring on the aforesaid surface, but also hardens it, so that it is rendered impenetrable to water and, in some cases, to oils and benzene. The material undergoing treatment consists essentially of concrete, or cement, or trass, and may be either in the form of solid bodies, or of relatively thin layers of plaster or mortar to be applied to various objects or bodies, the results being substantially similar, in the main, in both cases.

In carrying out the improved process, according to one form thereof, the exterior surface of the concrete article or body to be treated has applied to it a solution of a metallic salt or salts,—for instance, a sulfate of copper, iron, zinc, nickel or lead; or an acetate, chromate, nitrate, or chlorid, etc., fluorin and its derivatives, however, having proven incapable of being used, since the desired results are not obtainable therewith,— which has the effect of forming upon the surface thus treated a coating of the desired color, such color varying, of course, according to the metal or combination of metals employed. In many cases, an inner or subsurface coating or layer of great hardness and density is also formed, this second or inner coating or layer uniting with the outer coating to form a composite layer which is repellent to water and in some cases, to oil and benzene and, to some extent, to acids as well, as previously stated. The brilliancy of the color may be increased by subsequently enameling, glazing, varnishing or polishing the coating surface. Also, in cases where a particularly smooth and hard surface is required, the surface to be treated may be polished prior to the application of the initial coating, the polishing being effected in any known manner, for instance by rubbing the surface with a hard smooth object.

According to the other form which the process may take, one or more metals, or metal ores, or both, in finely divided or powdered condition, such as iron filings, ore, titanic iron and the like, may be mixed with the concrete or cement, or lime trass, and the resultant mass then applied in a plaster-like condition to the articles or bodies to be treated and thereafter coated with the metallic salt solution, the metal particles reacting both with the metal salt solution and with the constituents of the concrete or cement in producing otherwise unobtainable shades of bronze colors. The plaster produced in this way, adheres readily and firmly to the surface to which it is applied, and, hence, can be used upon walls, floors, ceilings and roofs of stone, cementitious material, brick, asbestos and wood, as well as upon sculptured, cast and molded articles, tiling and the like.

As examples of carrying out the process, the following may be given:—

1. Portland cement and water, or Portland cement, iron filings, (50% by volume) and water, are mixed together to form the desired mortar, which is then applied in a layer to the walls of a concrete tank, and thereafter treated with a solution of sulfate of copper. A coating is thereby formed on the mortar which is impenetrable to water, oil and benzene and the like.

2. A mortar, such as described in the first example, is applied to a concrete or cement wall, floor or dome, and thereafter treated with a solution of chlorid of zinc or nickel. A very hard and finely colored coating is thereby produced.

3. A roof or other tile is constructed of cement, cement and sand, or concrete and coated with a layer of the above-described mortar, after which it is allowed to harden to the proper extent and then treated with any one of the metal salt solutions previously referred to.

4. A pressed tile is formed of pure Portland cement, and, after it has sufficiently hardened, is treated with a solution of sulfate or acetate of lead, the coating thereby obtained penetrating the tile to a certain depth.

5. A block or tile made of cement or concrete, or lime trass is treated with sulfate of iron, either with or without pressure, such treatment hardening the block or stone considerably.

The process above outlined is herein claimed more or less broadly, and the use in such process of a sulfate solution of the character above indicated has also been claimed. Claims for the specific use of acetate, nitrate, chromate and chlorid solutions are not incorporated herein but are comprised in our companion applications, Serial Nos. 426,613, 426,614, 426,615, and 426,616, all filed November 26, 1920, and all constituting divisions of the present application.

We claim as our invention:—

1. The process of ornamenting surfaces composed of calcareous cements of the nature of hydraulic cement and of alkaline reaction because of the presence of lime therein, which comprises giving such a surface a thin outer colored coating by treating the surface with an aqueous solution of a neutral salt of a heavy metal forming colored oxids containing an acid not decomposed by the lime of the surface, whereby a deposit of a colored metal oxid is formed in the surface layer by the interaction between the lime and the acid contained in the salt.

2. The process of ornamenting surfaces composed of calcareous cements of the nature of hydraulic cement and of alkaline reaction because of the presence of lime therein, which comprises giving such a surface a thin outer colored coating by treating the surface with an aqueous solution of a sulfate of a heavy metal forming colored oxids, whereby a deposit of a colored metal oxid is formed in the surface layer by the interaction between the lime and said sulfate.

3. The herein-described process, consisting in mixing metallic material in a finely-divided state with cementitious material to form a mortar- or plaster-like body, and treating the surface of such body, after it has sufficiently hardened, with a metal salt solution, which will color and harden said surface.

In testimony whereof we have hereunto set our hands in presence of two subscribing witnesses.

LUDWIG ADRIAN SANDERS.
ARTHUR JULIUS SANDERS.

Witnesses:
D. KLEYN,
R. MONAGAN.